(12) United States Patent
Nakano et al.

(10) Patent No.: US 9,189,562 B2
(45) Date of Patent: Nov. 17, 2015

(54) APPARATUS, METHOD AND PROGRAM PRODUCT FOR CLASSIFYING WEB BROWSING PURPOSES

(75) Inventors: Wataru Nakano, Kanagawa-ken (JP); Masaru Suzuki, Kanagawa-ken (JP); Hideki Tsutsui, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 12/554,188

(22) Filed: Sep. 4, 2009

(65) Prior Publication Data

US 2010/0082673 A1 Apr. 1, 2010

(30) Foreign Application Priority Data

Sep. 30, 2008 (JP) .................................. 2008-255609

(51) Int. Cl.
*G06F 17/30* (2006.01)

(52) U.S. Cl.
CPC ...... *G06F 17/3089* (2013.01); *G06F 17/30876* (2013.01); *G06F 17/30899* (2013.01)

(58) Field of Classification Search
CPC ................................................ G06F 17/30876
See application file for complete search history.

(56) References Cited

U.S. PATENT DOCUMENTS

| 7,017,110 | B1 * | 3/2006 | Chi et al. ....................... 715/205 |
| 2001/0044795 | A1 * | 11/2001 | Cohen et al. ....................... 707/5 |
| 2002/0091836 | A1 * | 7/2002 | Moetteli ....................... 709/227 |
| 2002/0143940 | A1 * | 10/2002 | Chi et al. ....................... 709/225 |
| 2004/0267815 | A1 * | 12/2004 | De Mes ....................... 707/104.1 |
| 2006/0026013 | A1 * | 2/2006 | Kraft ....................... 705/1 |
| 2006/0080321 | A1 * | 4/2006 | Horn et al. ....................... 707/10 |
| 2009/0240686 | A1 * | 9/2009 | Murali ....................... 707/5 |

FOREIGN PATENT DOCUMENTS

| JP | 2001142907 | 5/2001 |
| JP | 2006-235875 | 9/2006 |

OTHER PUBLICATIONS

Welcome to AdSense; Google AdSense; https://www.google.com/adsense/login/en_US/?hl=en_US; Oct. 15, 2008.
Izu, Synchronized Browsing of Shared Navigation Histories for Group-Based Web Exploration, Report if IPSJ, Information Processing Society of Japan, Jul. 13, 2004, vol. 2004, No. 71, pp. 91-98.

(Continued)

*Primary Examiner* — Miranda Huang
(74) *Attorney, Agent, or Firm* — Amin, Turocy & Watson, LLP

(57) ABSTRACT

A web browsing purpose classification apparatus, including a display unit which displays a webpage and a document retrieval unit which retrieves document data from the displayed webpage. A keyword extraction knowledge unit stores knowledge necessary for keyword extraction. This knowledge is used by a keyword extraction unit to extract keywords from the document data. A webpage format determination knowledge unit stores knowledge necessary for the determination of webpage formats which is used by a webpage format determination unit to determine webpage formats. A web browsing history storage unit stores the keywords and webpage formats as web browsing history. A browsing purpose classification knowledge unit stores knowledge necessary for the classification of browsing purposes which is used by a browsing purpose classification unit to classify browsing purposes.

19 Claims, 19 Drawing Sheets

(56) References Cited

OTHER PUBLICATIONS

Sakai, Extraction of the Interest of a User According to Behavioral Targeting Focused on Link Navigation, 18th Data Engineering Workshop Papers Information (on line), Data Engineering Research Committee of the Institute of Electronics, Information and Communication Engineers, Jun. 1, 2007.

Japanese Office Action for Japanese Application No. 2008-255609 mailed on Nov. 9, 2012.

\* cited by examiner

| Element No. | Keyword Candidate | Parse | Semantic Attribute | Score |
|---|---|---|---|---|
| 1 | Notebook A | Proper Noun | Product | 2 |
| 2 | Model X | Proper Noun | Product Name | 2 |
| 3 | Net movie | Noun Phrase | Others | 1 |
| 4 | HDMI connector | Proper Noun | Product | 1 |
| ... | ... | ... | ... | ... |

FIG. 8

| URL Character String | Webpage Format |
|---|---|
| top.htm | Site top page |
| item | Product page or News article page |
| search, result | Search result page |
| search, keyword | Search result page |
| ... | ... |

| URL Structure | Webpage Format |
|---|---|
| Domain only | Site top page |
| ... | ... |

FIG. 10

| Date and Time | URL | Keyword | Webpage Type |
|---|---|---|---|
| 20080101_2130_1 | URL1.com/PC-A/modelX.html | Notebook A, Model X,... | Product Page |
| 20080101_2130_2 | URL1.com/PC-B/modelY.html | Notebook B, Model Y,... | Product Page |
| 20080101_2131_1 | URL1.com/PC-C/modelZ.html | Notebook C, Model Z,... | Product Page |
| 20080101_2133_1 | URL1.com/PC-D/modelXYZ.html | Notebook D, Model XYZ,... | Product Page |
| ⋮ | ⋮ | ⋮ | |
| 20080101_2325_4 | URL2.com/PC-D/modelXYZ.html | Notebook D, Model XYZ,... | Product Page |
| 20080102_0004_1 | URL2.com/PC-D/index.html | Notebook D, Model XYZ, Model XYZ-2, ... | Product Page (Index) |
| 20080102_0006_1 | URL2.com/PC-D/modelXYZ-2.html | Notebook D, Model XYZ,... | Product Page |
| ⋮ | ⋮ | ⋮ | |
| 20080102_0105_1 | URL3.com/PC/ | Notebook A, Notebook D,... | Site Top Page |
| 20080102_0105_2 | URL3.com/search/?keyword=PC-D | Notebook D, Model XYZ, Model XYZ-2, ... | Search Result Page |
| 20080102_0106_1 | URL3.com/PC/item/PC-D-modelXYZ-2.html | Notebook D, Model XYZ-2,... | Product Page |
| ⋮ | | ⋮ | ⋮ |

FIG. 11

| Browsing Purpose | |
|---|---|
| Target Keyword | Purpose |
| Notebook | Comparison |
| Model A | In-depth Research |
| Model B | In-depth Research |
| Web advertisement | Comparison |
| Marketing Advertisement | In-depth Research |
| (Empty) | Web Surfing |
| Soccer | Web Surfing |
| Sports Meet | Web Surfing |
| Male Volleyball | In-depth Research |

FIG. 12

| Browsing Path Pattern | Extracted Keywords | Target Keyword | Purpose |
|---|---|---|---|
| (1) Site Top Page<br>(2) Article A in page (1)<br>(3) Article B in page (2)<br>(4) Article C in page (3) | -<br>Keyword A, B, C<br>Keyword A, C, F<br>Keyword A, D, E | Keyword A | Comparison mode |
| (1) Site Top Page<br>(2) Article A in page (1)<br>(3) Article B in page (1)<br>(4) Article C in page (1) | -<br>Keyword A, B<br>Keyword C, D, E<br>Keyword F | - | Web surfing mode |

APPARATUS, METHOD AND PROGRAM PRODUCT FOR CLASSIFYING WEB BROWSING PURPOSES

CROSS-REFERENCE TO RELATED APPLICATIONS

This application is based upon and claims the benefit of priority from the prior Japanese Patent Application No. 2008-255609 filed on Sep. 30, 2008; the entire contents of which are incorporated herein by reference.

TECHNICAL FIELD

The present invention relates to a web browsing purpose classification apparatus, method and program for the classification of the user's web browsing purposes.

BACKGROUND

At present, there many related information recommendation systems on the market to present information related to the webpage currently being viewed by a user. As currently used by Google® AdSense, users are able to access related information or make purchases by clicking on the links or advertisements placed within the webpage. However, such systems are not able to take the user's browsing purpose into consideration when information is to be offered. As such, systems currently available do not fully utilise information related to the users. Instances may arise where the user is unnecessarily inconvenienced with links and information totally unrelated to the current browsing purposes and needs.

An information recommendation system in which the users' preferences and habits are taken into consideration is disclosed in JP-A 2001-142907 (KOKAI). In this system, individual web visitors and their browsing time changes are tracked and identified with individual group members of certain user groups to create a user profile detailing internet usage. This profile is then used as the basis for the sending of related marketing and product information as well as for the customization of web contents. It can also be used for other promotional purposes, thereby creating an internet profiling system that supplies information more relevant to the users' browsing habits.

However, one significant drawback of this system is evident when the user is only surfing the internet with no specific purpose or objective. The system is unable to discern the users' purpose or objective. Instead, the system keeps track of a pointless surfing pattern which results in unrelated information being supplied in the future.

SUMMARY

To address the above described problems, the present invention provides an apparatus, method or program to classify web browsing purposes.

According to an embodiment of the present invention, there is provided an apparatus of classifying web browsing purposes, the apparatus including a display unit displaying a webpage. A document retrieval unit retrieves document data from the displayed webpage and a keyword extraction unit then extracts keywords from the document data based on knowledge stored in a keyword extraction knowledge unit. A webpage format determination unit determines the webpage format based on knowledge in a webpage format determination knowledge unit. A web browsing history storage unit stores the keywords and webpage formats as web browsing history which is used by a browsing purpose classification unit to classify browsing purposes based on the browsing history and knowledge stored in a browsing purpose classification knowledge unit.

According to another embodiment of the present invention, there is provided a method of classifying web browsing purposes, the method includes displaying a webpage on a display unit and retrieving document data from the displayed webpage. Keywords are then extracted from the document data based on knowledge stored in a keyword extraction knowledge storage unit. The webpage formats are also determined based on knowledge stored in a webpage format determination knowledge unit. The extracted keywords and determined webpage formats are then stored as web browsing history for use in conjunction with knowledge stored in a browsing purpose classification knowledge unit for classifying browsing purposes.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following description when considered in conjunction with the drawings.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

FIG. 8 is a diagram illustrating an example of the webpage format determination knowledge stored in webpage format determination unit 17.

FIG. 10 is a diagram showing the browsing history stored by browsing history storage unit 18 as shown in S106 of FIG. 2.

FIG. 11 is a diagram illustrating an example of the classification of browsing purposes carried out by browsing purpose classification unit 19 as shown in S107 of FIG. 2.

FIG. 12 is a diagram illustrating an example of the knowledge stored inside the browsing purpose classification knowledge unit 19 as shown in S107 of FIG. 2.

DETAILED DESCRIPTION

Embodiments of the present invention are described below with reference to the attached drawings.

The first embodiment of the present invention is in the form of a software module that operates on a client terminal. The embodiment uses a web browser that is displayed on the user terminal, wherein when a user browses a webpage, a web browsing purpose classification apparatus, method or program is utilised to classify the user's web browsing purpose.

Figure 1:
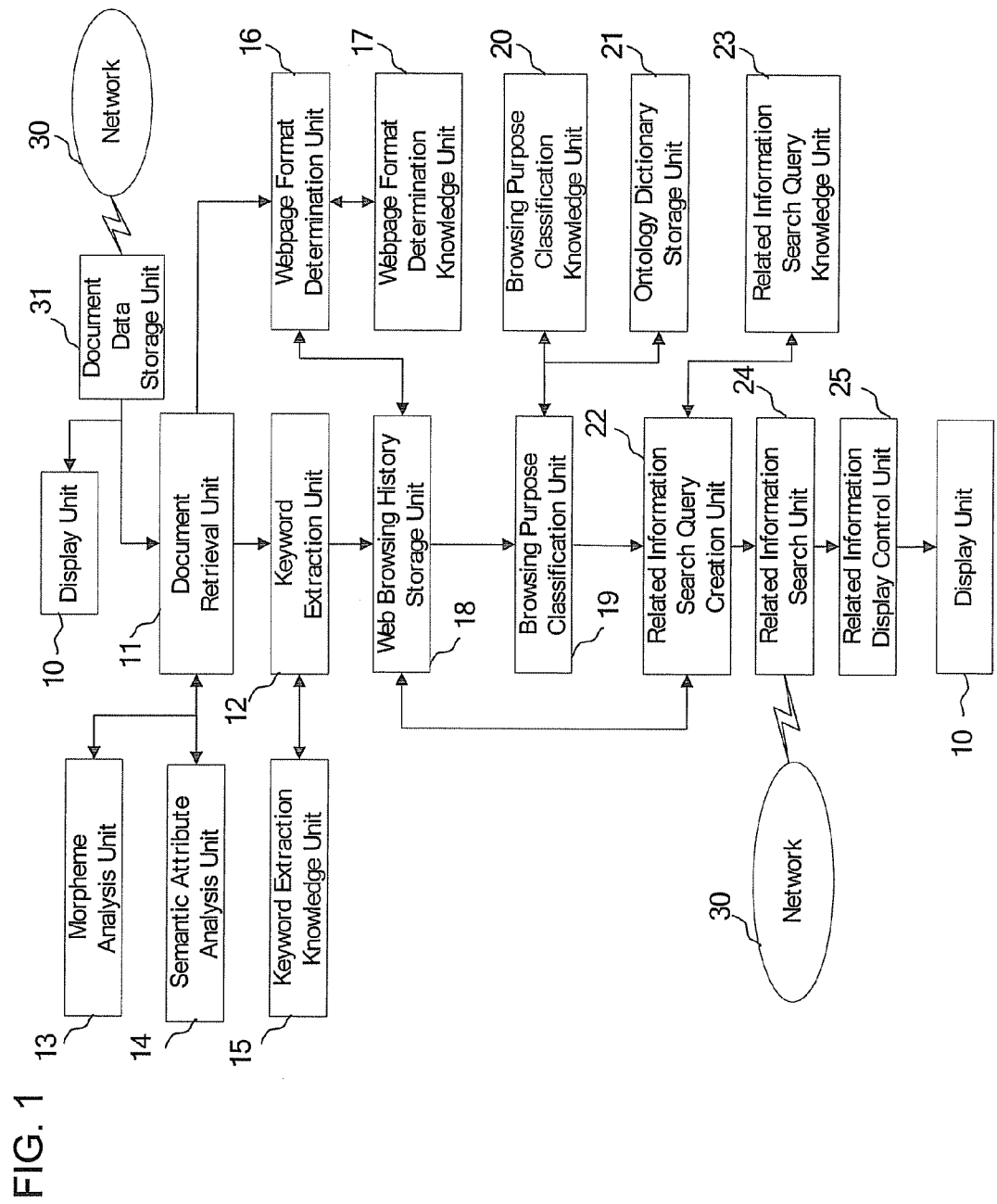
FIG. 1 is a functional block diagram illustrating the web browsing purpose classification apparatus of the present invention.

FIG. 1 shows the functional block diagram of the first embodiment of the web browsing purpose classification apparatus of the present invention. The various components are explained in greater detail below.

The webpage that the user is actively viewing is displayed on display unit 10. The webpage is obtained from network 30 and stored in document data storage unit 31.

The document retrieval unit 11 retrieves the documents displayed on display unit 10 from the document data storage unit 31. HTML document data, including HTML tags, are obtained from the webpage. The HTML document can be obtained the moment the webpage is displayed on display unit 10, after the webpage has been checked and deemed to be active by display unit 10 or when the webpage has been deemed to be active for a predetermined length of time. Other criteria can also be used to determine if the HTML document is to be obtained. The determination of the length of time during which the window is deemed active can be carried out by instruments capable of measuring time like a clock or a timer. This instrument can be contained within display unit 10 or document retrieval unit 11.

The keyword extraction unit 12 extracts keywords from the HTML document data obtained by the document retrieval unit 11. These keywords are used to generate search queries for related information. The extraction of keywords is carried out by splitting up the contents of the HTML document into separate character strings and having the separate character strings filtered and narrowed down to yield keywords.

The morpheme analysis unit 13 is used to carry out morpheme analysis of the HTML document data obtained by document retrieval unit 11 so as to enable the splitting up of the HTML document into separate character strings. In the process of narrowing down the character strings, semantic attribute analysis unit 14 is used to append semantic attributes to the separate character strings. It is also possible to selectively narrow down certain separate character strings with special semantic attributes as keywords. Once morpheme analysis and semantic attribute analysis have both been carried out, the keyword extraction unit 12 extracts the keyword based on the knowledge stored within keyword extraction knowledge unit 15.

The webpage format determination unit 16 determines the format of the webpage that is being displayed on display unit 10. Examples of webpage formats include portal website top pages, link sites, search result pages, webpages with articles or product information, blog entries, etc. The formats are not limited to only the above and neither is there a need to determine the webpage format to be one of the above. The knowledge needed to determine the webpage format is stored in webpage format determination knowledge unit 17 and will be explained further later.

The web browsing history storage unit 18 stores the browsing history of the user. Examples of information being stored include the URLs of webpages viewed, metadata of webpages viewed, webpage formats obtained from webpage format determination unit 16, the webpage keywords obtained from the webpage by keyword extraction unit 12, etc.

The browsing purpose classification unit 19 classifies the browsing purposes of the user. For example, if the user is not browsing with a specific keyword or webpage format being used consistently, it is taken that the user is simply "Web Surfing"; that is, arbitrarily moving from one website to another website. The different browsing purposes will be explained in greater detail later. The classification of browsing purposes is carried out based on the past and present browsing history stored in web browsing history storage unit 18 as well as the knowledge stored in browsing purpose classification knowledge unit 20. It is also possible to classify the web browsing purposes by using the ontology dictionaries stored in the ontology dictionary storage unit 21. The range of the web browsing history to be used for web browsing purpose classification can be statically limited according to the browsing history or dynamically changed in response to the browsing time and date.

The related information search query creation unit 22 creates the search queries for the searching of information related to the contents of the webpage being viewed. The keywords extracted by keyword extraction unit 12 are used to provide an indicator of or a clue to the contents of the webpage. These keywords are then used with the web browsing purpose determined by web browsing purpose classification unit 19 to limit the contents of the related information which in turn allows for more effective search query creation. The creation and limiting of the search queries is carried out based on the knowledge stored in the related information search query knowledge unit 23. The related information search unit 24 then carries out a search on the network 30, which is the same as the aforementioned network from which the documents were obtained, based on the created search query. The results of the search are then received by related information search unit 24.

The related information display control unit 25 receives the search results obtained by related information search query unit 24 and displays them on display unit 10. The display methods include displaying the URLs if the related information is in the form of webpages, displaying a summary of the webpage or keywords which have been deemed to be the basis on which the information is related. However, it should be noted that the display methods are not limited to the above.

Figure 2:
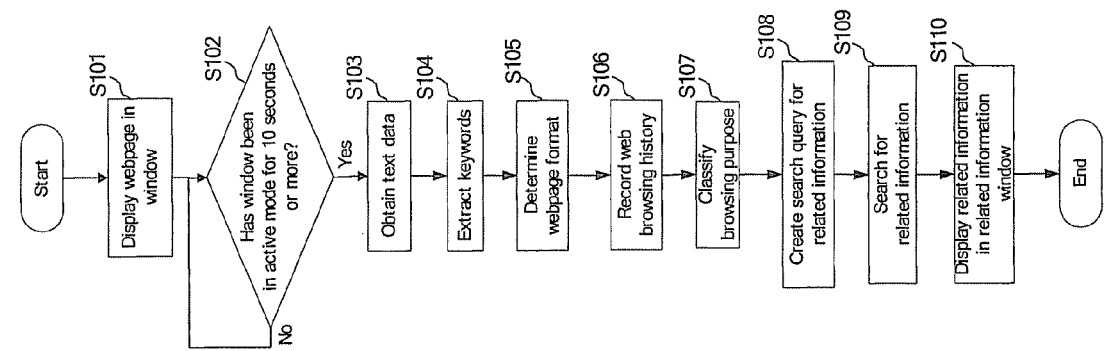
FIG. 2 is a diagram illustrating the process flow of the web browsing purpose classification apparatus as shown in FIG. 1.

FIG. 2 is a diagram illustrating the overall flow of the methodologies associated with the first embodiment of the present invention. A webpage is first shown on display unit 10 (S101). Next, document retrieval unit 11 carries out a status check to check if the window shown in display unit 10 is an active window and if so, whether it has been active for 10 or more seconds through the use of a clock or timer (S102). If the window is found to be inactive or it has not been active for ten or more seconds, the check on the status of the window displayed in display unit 10 is carried out again (S102 N). If the window is found to be active or it has been active for ten or more seconds, the document retrieval unit 11 will obtain HTML document data from the webpage shown on display unit 10 (S103). Next, the keyword extraction unit 12 extracts keywords representative of the contents of the webpage from the HTML document obtained by document retrieval unit 11 (S104). The webpage format determination unit 16 also determines the format of the webpage from the HTML document obtained, based on the knowledge stored in the webpage format determination knowledge unit 17 (S105). The process by which the format of the webpage is determined is explained later with the use of FIG. 8. Next, the web browsing history storage unit 18 stores the URLs obtained from the HTML document, the webpage format determined by the webpage format determination unit 16 and the keywords representing the contents of the webpage which have been extracted by the keyword extraction unit 12 as browsing history (S106). The browsing purpose classification unit 19 then classifies the browsing purpose for the webpage currently being viewed based on the knowledge stored in the browsing history (S107). Once the browsing purposes have been classified, the related information search query creation unit 22 will utilise these browsing purposes to create the search queries for information related to the contents and browsing purposes of the currently viewed webpage (S108). The related information search unit 24 then takes these search queries and sends them to an externally located web search engine for a search to be carried out (S109). The search results are then received by the related information search unit 24. The related information display control unit 25 displays the search results on display unit 10 before the process is terminated (S110).

Figure 3:
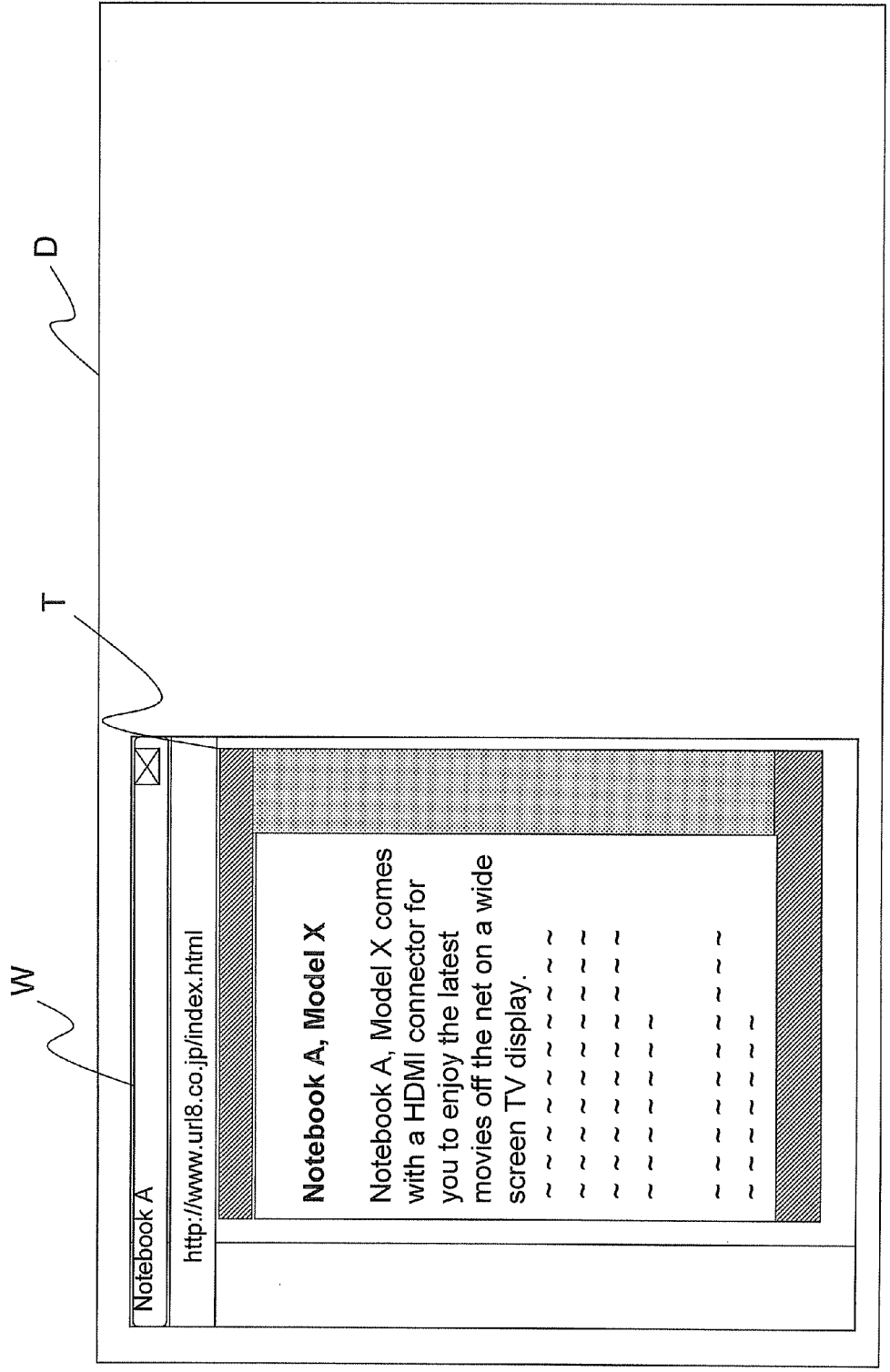
FIG. 3 is a diagram illustrating an example of the image shown on the web browsing purpose classification apparatus as shown in S101 of FIG. 2.

An example of the webpage being displayed in display unit 10 is shown T in FIG. 3. Text box T is displayed on in a window W. Window W is shown in on a display D which is actually display unit 10 of a client terminal.

Figure 4:
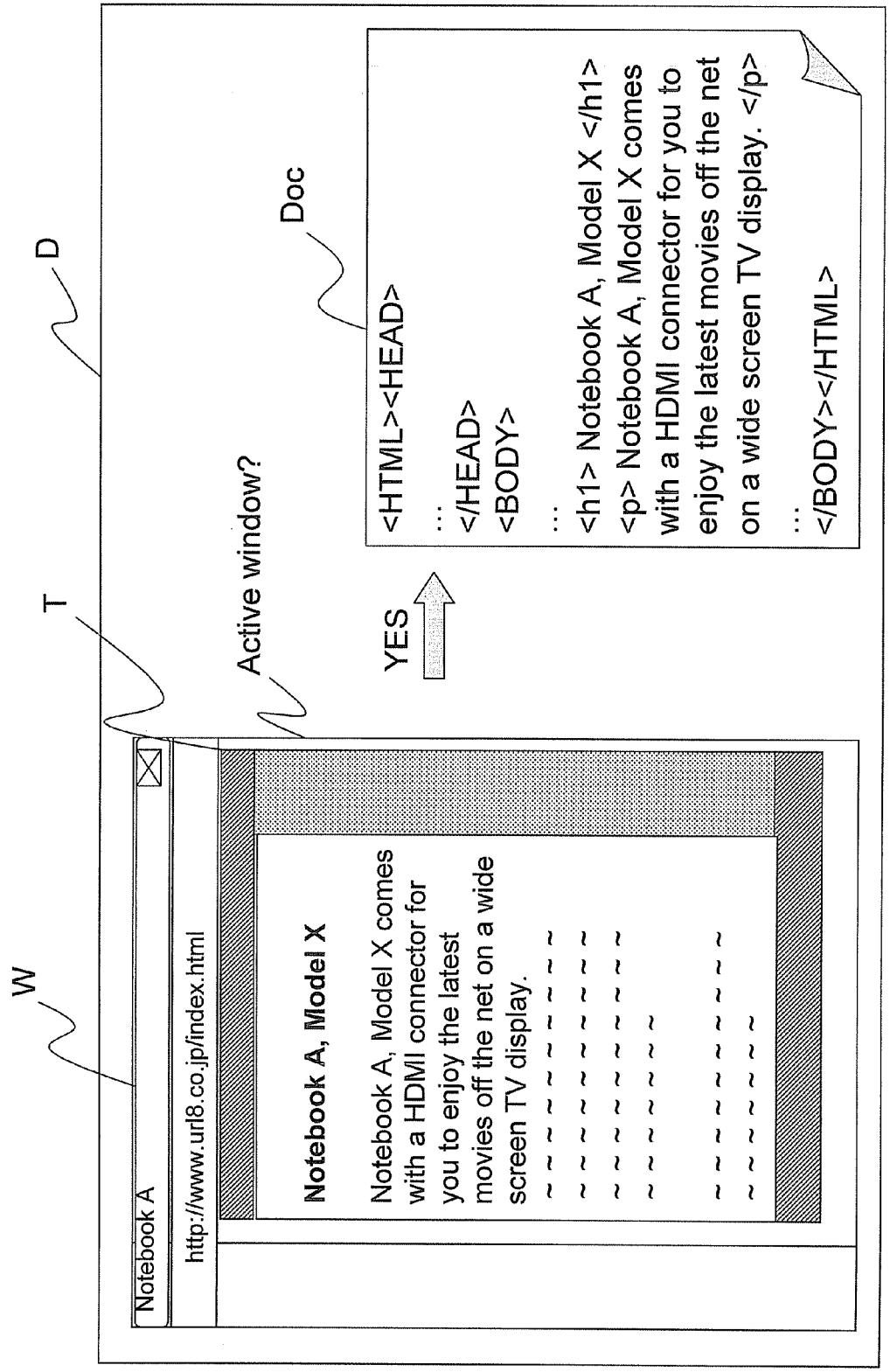
FIG. 4 is a diagram illustrating an example of the image shown on the web browsing purpose classification apparatus as shown in S102 and S103 of FIG. 2.

FIG. 4 shows an example of HTML document data Doc which is obtained from the webpage. The URL of the webpage is included amongst the HTML document data obtained. Doc contains HTML document in which HTML tags are included. As shown in FIG. 4, tags like <BODY> and <P>, headlines and titles like <h1>Notebook A. Model X</h1> and paragraphs like <p>Notebook A, Model X comes with a HDMI connector for you to enjoy the latest movies off the net on a wide screen TV display. </p> are also included. The text included within <h1> and </h1> is taken to be one headline while the text included within <p> and </p> is taken to be one paragraph.

Figure 5:
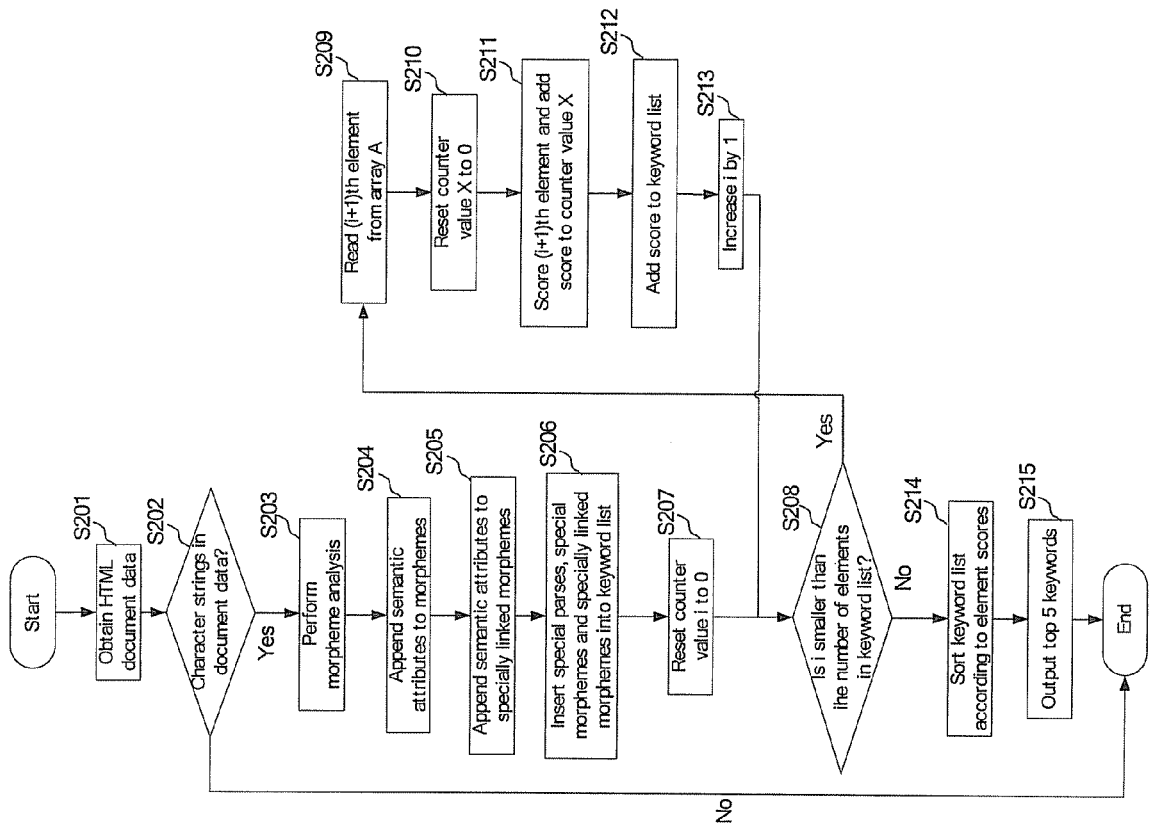
FIG. 5 is a diagram illustrating the process flow of keyword extraction unit 12 as shown in S104 of FIG. 2.

Next, step 104 of FIG. 2 is explained in greater detail. The flow of the process by which keywords are extracted from the HTML document data by keyword extraction unit 12 is shown in FIG. 5. Document retrieval unit 11 first obtains the HTML document data (S201). A check is then carried out to check if there are character strings in the HTML document data (S202). If there are no character strings, then the processing of the webpage is terminated (S202 No). If character strings are present (S202 Yes), then morpheme analysis is carried out on the HTML text data (S203). In this case, morphemes are made up of data comprising morpheme character strings, the respective parse information and information regarding its position of appearance in the document. The semantic attribute analysis unit 14 than performs semantic attribute analysis and attaches semantic attributes to morphemes (S204). Next, the semantic attribute analysis unit 14 appends semantic attributes to specially linked morphemes (S205). The keyword extraction unit 12 then inserts special parses, morphemes with semantic attributes appended and specially linked morphemes to the keyword list (S206). At this point, the counter value i is reset to 0 (S207). A check is carried out to determine if the value of counter i is smaller than the number of elements in the keyword list (S208). If the value of counter i is smaller than the number of elements in the keyword list (S208 Yes), then the $(i+1)^{th}$ element of the keyword list are read out (S209). The counter value X is then reset to 0 (S210). Next, the read element is scored based on the knowledge stored in the keyword extraction knowledge unit 15 and the score added to counter X (S211). Examples of the knowledge stored in the keyword extraction knowledge unit 15 include the number of occurrences of the element in the document and the position in the document, the position and meaning of the keyword according to the HTML tag, etc. This knowledge can be used as an entire package or individually. The score is then incorporated into the keyword list (S212) before i is increased by 1 (S213). The process then loops back to check the value of i with the number of elements in the keyword list again. If the value of i is greater than the number of elements in the keyword list (S208 No), then the keyword extraction unit 12 sorts the keyword list according to descending order of the score (S214). The top 5 keywords after the list has been sorted are outputted as the webpage keywords before the process is terminated (S215).

Figure 6:
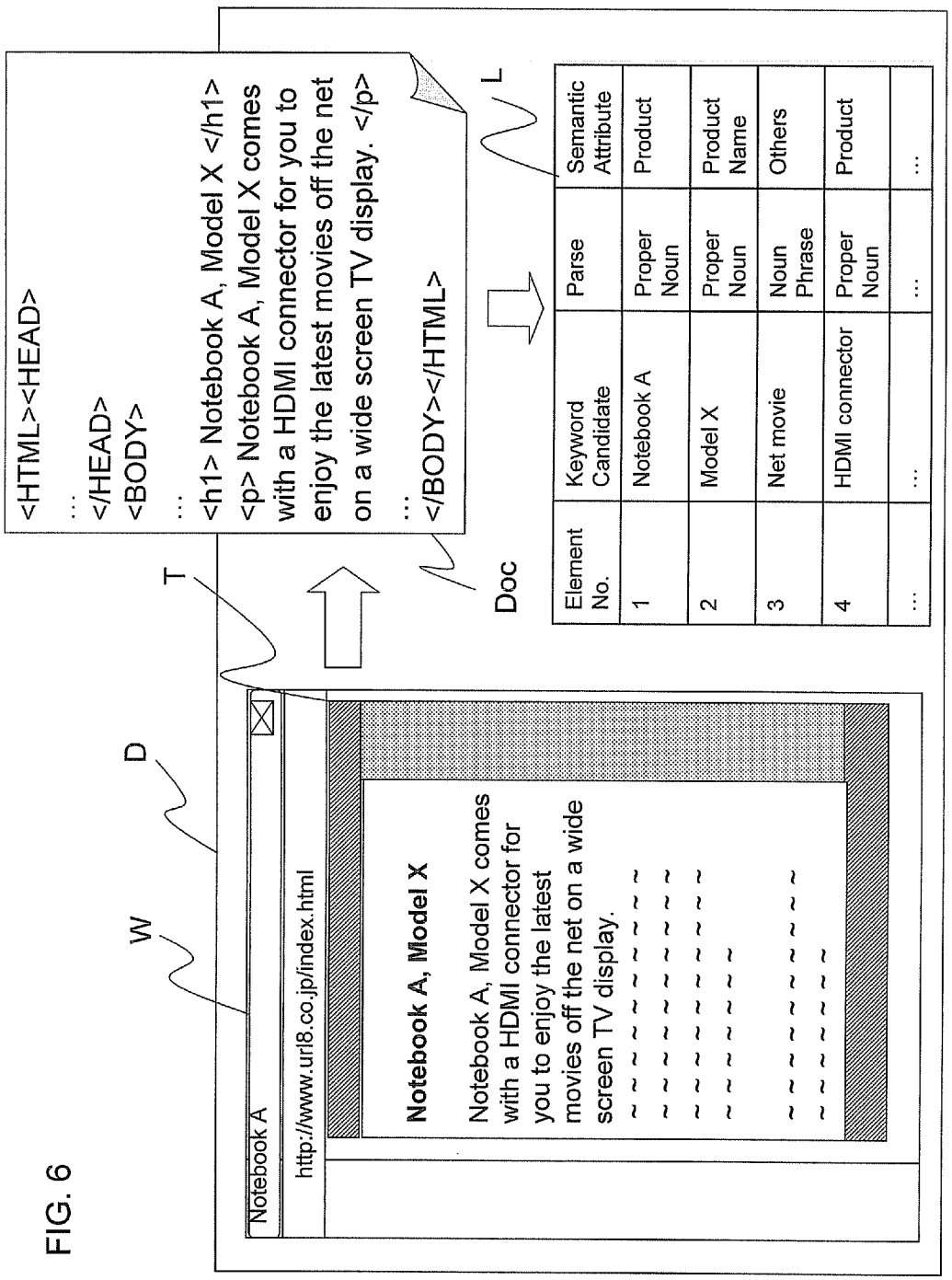
FIG. 6 is a diagram illustrating an example of the image shown on the web browsing purpose classification apparatus after keywords have been extracted by the keyword extraction unit 12 as shown in S104 of FIG. 2.

FIG. 6 shows an example of keywords extracted from the webpage. First. HTML document data is obtained from the webpage as shown in S103 of FIG. 2. Keywords are then extracted from the HTML document data and shown in keyword list L as described in S104 of FIG. 2. In this example for L, proper nouns, nouns and noun phrases are selected as keywords. In FIG. 6, the keywords "Notebook A" with the semantic attribute "Product" and parse "Proper Noun", "Model X" with the semantic attribute "Product Name" and parse "Proper Noun", "Net Movie" with the semantic attribute "Others" and parse "Noun Phrase" and "HDMI Connector" with the semantic attribute "Product" and parse "Proper Noun" are chosen. The element number is also added to the leftmost column of the keyword list.

Figure 7:
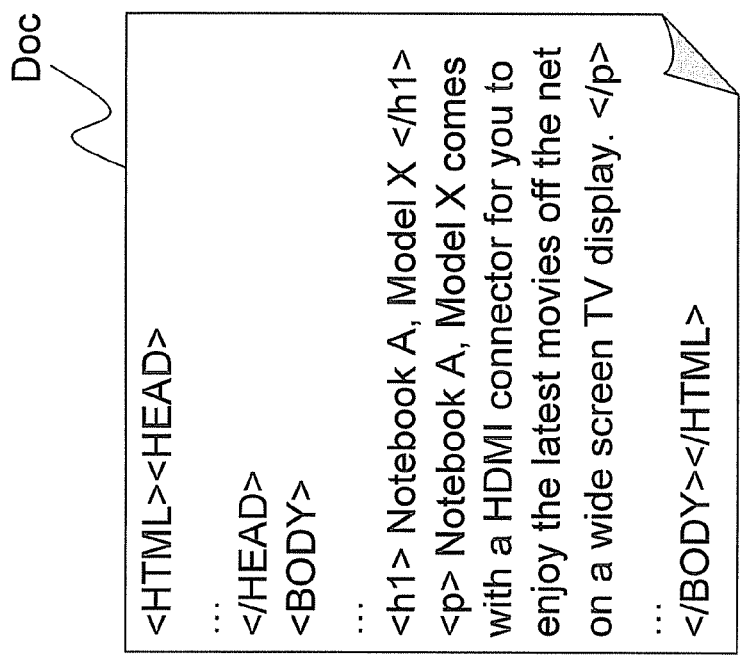
FIG. 7 is a diagram illustrating an example of the image shown on the web browsing purpose classification apparatus during the webpage format determining carried out by webpage format determination unit 16 as shown in S105 of FIG. 2.

FIG. 7 illustrates the keyword scoring and extraction process in greater detail. The uniqueness of the webpage HTML structure, URL structure, presence of special character strings, etc. are taken into consideration during the scoring process. FIG. 7 shows a keyword list that has undergone the scoring process described in S211 of FIG. 5. In this example, the number of occurrences is taken to be the scoring criteria and the list is sorted as per S214 of FIG. 5. For example, the keywords "Notebook A" and "Model X" appear twice in the document, thus they are accorded the score of 2. As the keywords "Net movie" and "HDMI connector" only appear once in the document, they are only given scores of 1.

FIG. 8 shows an example of the knowledge stored in the webpage format determination knowledge unit 17. In this example, the webpage format is determined either by the character strings found in the URL, or the structure of the URL. For example, if "top.htm" is found in the URL of the webpage, then the webpage is deemed to be a site top page. If the character string "item" is found in the URL, then the webpage is deemed to be a product page or a news article page. If the character strings "search, result" or "search, keyword" can found in the URL, then the webpage is deemed to be a search result page. As seen in the lower table, the URL structure can also be used to determine the webpage format. For example, if the URL structure is of the "Domain only" type, then the webpage is taken to be a site top page.

Figure 9:
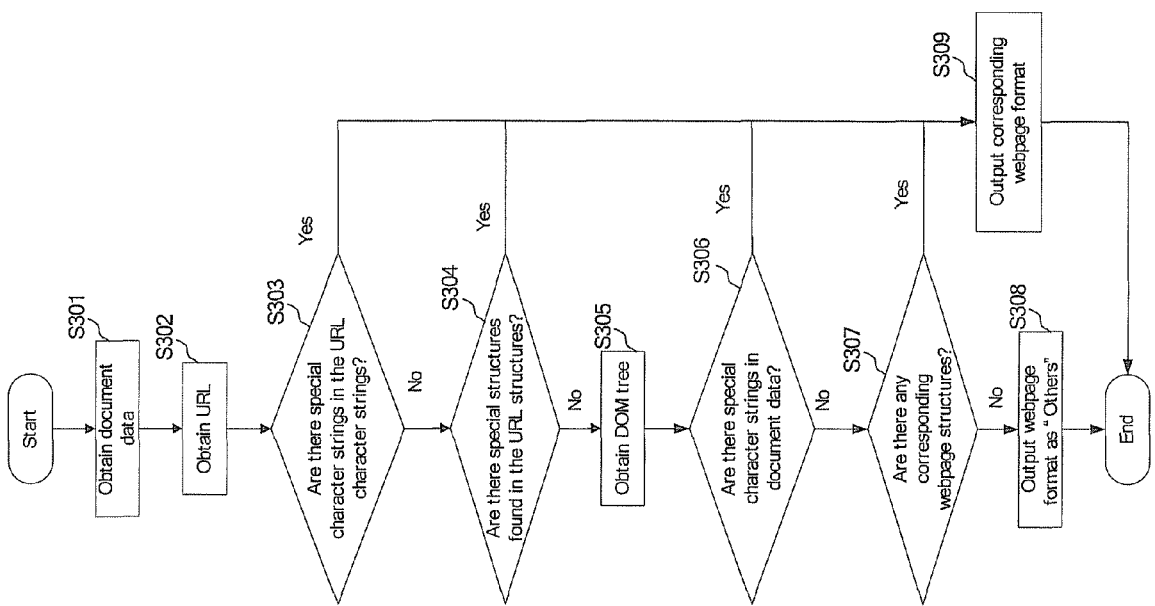
FIG. 9 is diagram illustrating the flow of the webpage format determination process carried out by the webpage format determination unit 16 as shown in S105 of FIG. 2.

Next, S105 of FIG. 1 is explained in greater detail. FIG. 9 shows the flow of the webpage format determination process. First, document data is obtained by webpage format determination unit 16 from text retrieval unit 11 (S301). Next the URL of the webpage is obtained from web browsing history storage unit 18 (S302). The URL data is contained within the HTML document data. A check is then carried out to determine if the character strings contained in the URL correspond to the special character strings stored in webpage format determination knowledge unit 17 (S303). If such character strings exist (S303 Yes), then the corresponding webpage format is outputted as the format for the webpage and stored as history information before the process is terminated (S309). FIG. 10 is used to explain the various webpage formats in greater detail later. If such character strings do not exist (S303 No), then the URL structure is compared to the special URL structures stored in webpage format determination knowledge unit 17 (S304). If such URL structures exist (S304 Yes), then the corresponding webpage format is outputted as the format for the webpage and stored as history information before the process is terminated (S309). If such URL structures do not exist (S304 No), then the webpage document object model (DOM) tree is obtained (S305).

Next, a check is carried out to see if there are the character strings of the HTML document data corresponds to any special character strings stored within webpage format determination knowledge unit 17 (S306). If such character strings exist (S306 Yes), the corresponding webpage format is outputted as the format for the webpage and stored as history information before the process is terminated (S309). If such character strings do not exist (S306 No), a check is carried out to see if the webpage structure corresponds to any webpage structures stored in the webpage format determination knowledge unit 17 (S307). If such webpage structures exist (S307 Yes), then the corresponding webpage format is outputted as the format for the webpage and stored as history information before the process is terminated (S309). If such webpage structures do not exist (S307 No), then the webpage format is taken to be "Others" and the process is terminated (S308).

FIG. 10 shows an image of the information stored within web browsing history storage unit 18. The user's web browsing history up to the present moment is stored in chronological order within the web browsing history storage unit 18. Other information like the number of times the webpage has been accessed by the user, the amount of time spent on the webpage, etc. can also be stored. In this example, at the time "20080101_2130_1", as the user is browsing "URL1.com/PCA/modelX", web browsing history storage unit 18 stores this information along with the keywords "Notebook A, Model X" extracted by keyword extraction unit 12 and the webpage format "Product Page".

The browsing purpose classification unit 19 classifies the user's browsing purpose with regards to the page currently being viewed. In this example, the classification is carried out based on the browsing history stored within the web browsing history storage unit 18. The 5 newest browsing history items or the browsing history of the past 24 hours can be taken to be the range of the browsing history to be used. In this example, the web browsing history is taken from an amalgamation of the extracted keywords of the webpage and the browsing purpose type. Examples of the browsing purpose type include the following 2 main modes: a information collection mode in which the user is collecting information regarding a specific topic and a web surfing mode where the user is just surfing the web. The information collection mode is further divided into an in-depth research mode where the user is collecting in-depth information about a specific topic and a comparison mode where the user is collecting information for comparison purposes. In this embodiment, the browsing purpose classification unit 19 determines and classifies the browsing purposes based on the above 4 browsing modes as well as the target keywords chosen.

The classification of browsing purposes is carried with the usage of the knowledge stored in browsing purpose classification knowledge unit 20 and the ontology dictionaries stored in the ontology dictionary storage unit 21. Three examples of the elements used for classification are listed, namely, the common characteristics among keywords, the special characteristics of the web browsing path and the ontology between keywords. The common characteristics among keywords refer to whether there are any keywords which are reoccurring in the extracted keyword list as well as the reoccurrence degree. For example, if the webpage currently being viewed has no keywords which are similar to those extracted from the recently browsed webpages, the user is deemed top have no specific browsing purpose and is considered to be in web surfing mode. On the other hand, if there were to be a common keyword across the pages, the user is deemed to be collecting information in information collection mode.

The special characteristics of the web browsing path refers to the usage of special paths to arrive at the webpage currently being viewed as based on the recent browsing history and the webpage format. For example, the user is deemed to be carrying out a comparison analysis if the results of a search on a webpage are clicked one by one. On the other hand, if the user were to use the links on a news article page or a product page, or initiate a new search, the mode is considered as in-depth research.

An example of the knowledge stored in the browsing purpose classification knowledge unit 20 is shown in FIG. 12. In this example, the user's browsing purpose is determined by the browsing path pattern as well as the keywords extracted from the webpages. For example, the user views a site top page and selects the first article A from the page from which the keywords A, B and C are extracted. The user then selects an article B from the article A page and the keywords A, C and F are extracted. The user then proceeds to select and article C from the article B page and the keywords A, D and E are extracted. In this example, keyword A appears as a common keyword across all three pages thus it is chosen as the target keyword. At the same time, the browsing pattern is such that the articles are chosen in a straight line from the top page. As such, the browsing purpose is taken to be comparison mode. On the other hand, if the selection of webpages were to be random, as seen in the lower row of FIG. 12, the browsing purpose is classified as web surfing mode.

Figure 13:
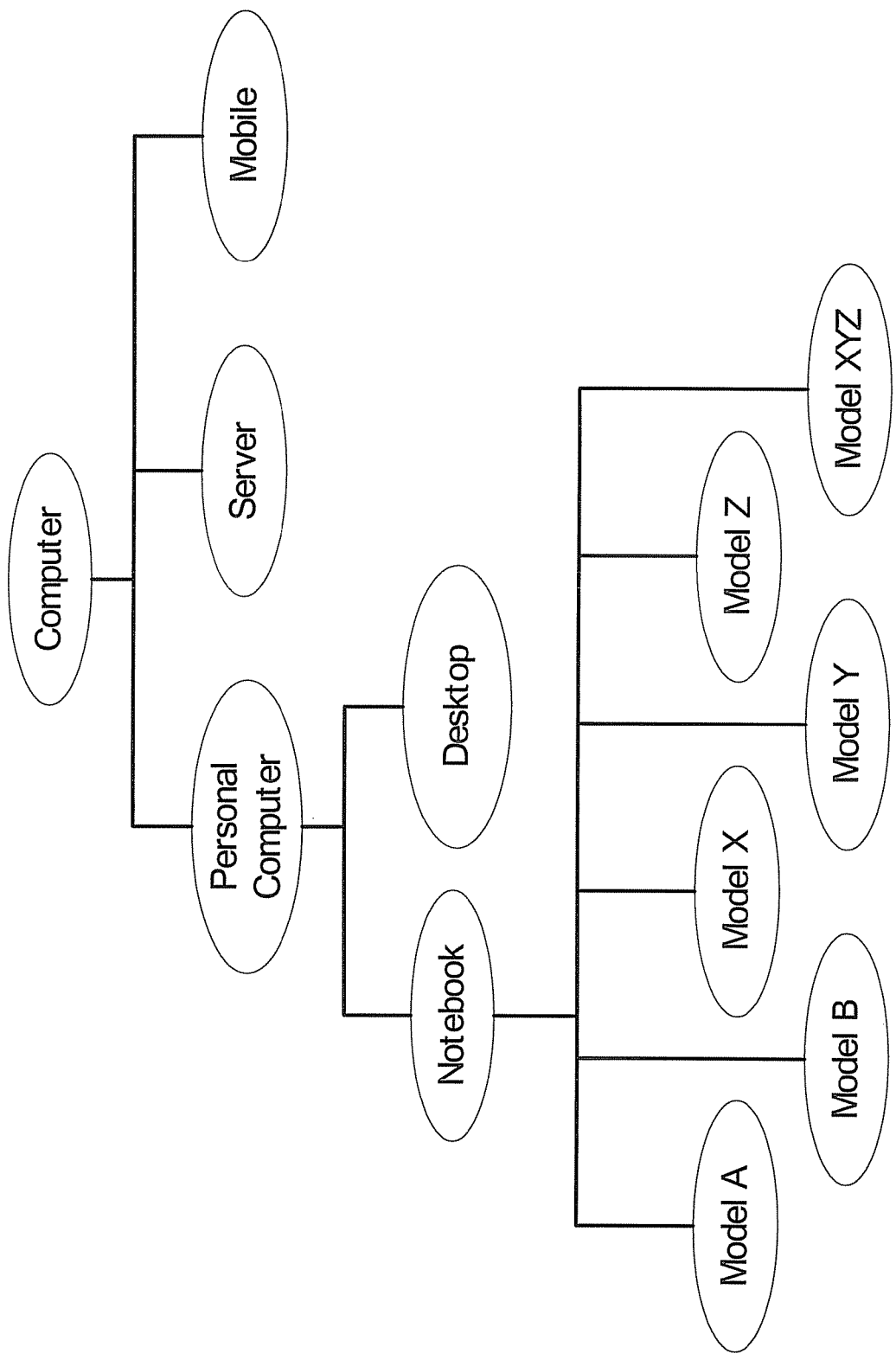
FIG. 13 is a diagram illustrating an example of the ontology examples stored inside the ontology dictionary memory unit 21 as shown in S107 of FIG. 2.

An example of the ontology dictionary stored in the ontology dictionary storage unit is shown in FIG. 13. With the use of this product ontology, detailed classification of the browsing purposes can be achieved by using the common characteristics of keywords and the various combinations. For example, if the higher order topic of notebook were to be chosen in conjunction with the various lower order topics, then the user is deemed to carrying out comparison analysis on notebooks. The target keyword is set as "notebooks" and comparison mode is chosen as the browsing purpose.

Figure 14:
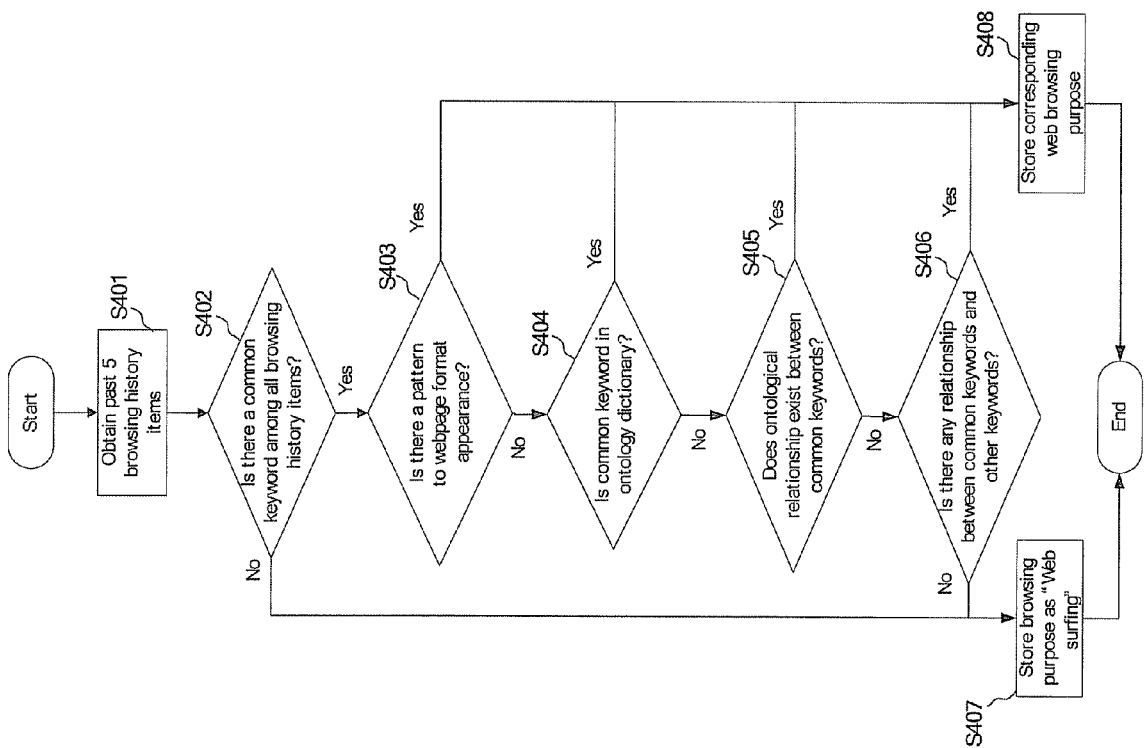
FIG. 14 is a diagram illustrating the flow of the browsing purpose classification process carried out by browsing purpose classification unit 19 as shown in S107 of FIG. 2.

S107 of FIG. 1 is explained in greater detail next. FIG. 14 shows the flow of the browsing purpose classification process. First, the 5 latest browsing history items are obtained from web browsing history storage unit 19 (S401). Next, a check is carried out to see if there are any common keywords in the browsing history (S402). If there are no common keywords (S402 No), then the browsing purpose is determined to be "web surfing" and stored accordingly before the process is terminated (S407). If common keywords are present (S402 Yes), a check is carried out to see if there is a pattern to the appearance of the webpage formats in the browsing history items (S403). If there is a pattern to the appearance of webpage formats (S403 Yes), then the corresponding web browsing purpose is chosen and stored (S408). If no pattern is present (S403 No), then a check is carried out to see if the common keywords are present in the ontology dictionary storage unit 21 (S404).

If the common keywords exist in ontology dictionary storage unit 21 (S404 Yes), then the corresponding web browsing purpose is chosen and stored (S408). If the common keywords do not exist in ontology dictionary storage unit 21 (S404 No), then a check is then carried out to see if there is any ontological relationship between common keywords stored in ontology dictionary storage unit 21 (S405). If such an ontological relationship exists (S405 Yes), then the corresponding web browsing purpose is chosen and stored (S408). If the ontological relationship does not exist (S405 No), then a check is carried out to see if there is any relationship between the common keywords and the other keywords in the webpages (S406). If such a relationship exits (S406 Yes), then the corresponding web browsing purpose is chosen and stored (S408). If no such relationship exists (S406 No), then the browsing purpose is determined to be "web surfing" and stored accordingly before the process is terminated (S407).

The related information search query creation unit 22 creates a search query for obtaining information related to both the current webpage contents as well as the browsing purpose by using the browsing purpose obtained by the browsing purpose classification unit 19. The related information search knowledge unit 23 contains the knowledge needed for creating the search queries. In this embodiment, in order to better classify the browsing purpose, information matching the browsing purpose and contents is collected. For example, if the user were to browsing with the purpose of "comparison analysis if notebooks", then URLs like notebook explanation pages for models hitherto unseen by the user and pages showing comparisons of the models viewed up to now by the user are recommended to the user. If the browsing purpose were to be "in-depth research on notebook A", then URLs like blogs on user opinions of notebook A, notebook A image galleries, notebook A peripheral item pages, etc. are recommended. If the browsing purpose were to be plain old "web surfing", then the keyword extracted the most number of times is selected in place of the keywords for the current webpage. In the carrying out of the related information search, search query creation methods like grouping of special expressions with the target keywords, narrowing down the search categories by setting limiting condition or changing the search engines in accordance to keywords can be used.

Figure 15:
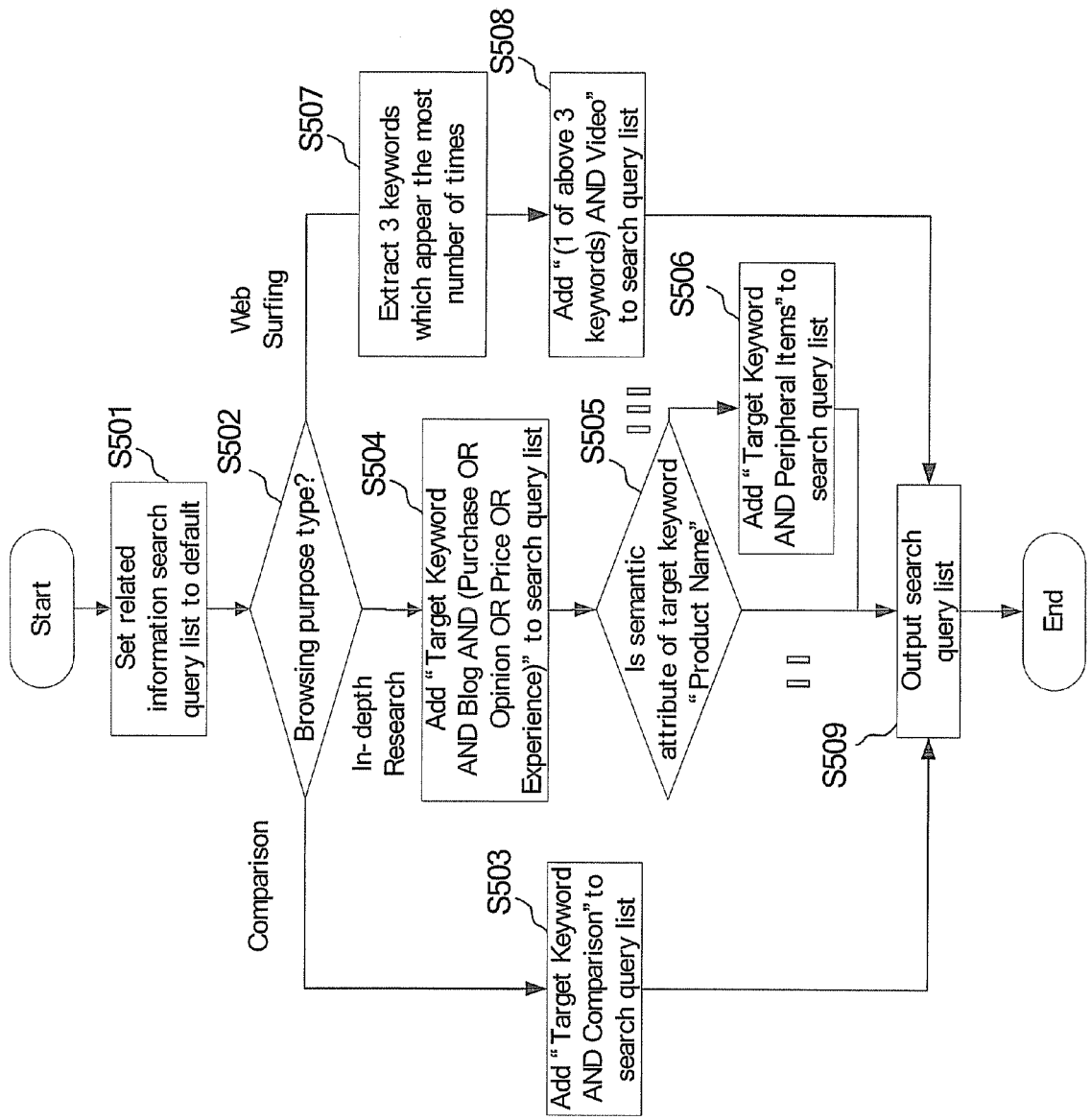
FIG. 15 is a diagram illustrating the flow of the search query creation process carried out by the search query creation unit 22 as shown in S108 of FIG. 2.

FIG. 15 shows the flow of the search query creation process. The search query list is first set to default (S501). Next, a check is carried out to determine the browsing purpose type by the browsing purpose classification unit 19 in conjunction with browsing purpose classification unit 20 and ontology dictionary unit 21 (S502). The search query creation method differs from purpose to purpose. If the browsing purpose is determined to be "comparison", than "Target keyword AND Comparison" is added to the search query list (S503) before the list is outputted (S509). If the browsing purpose is determined to be "in-depth research", then "Target keyword AND Blog AND (Purchase OR Opinion OR Price Or Experience)" is added to the search query list (S504). The related information search query knowledge unit 23 stores the creation methods mentioned in S503 and S504. A check is then carried out to check if the semantic attribute of the target keyword is "Product Name" (S505). If the semantic attribute were to be "Product Name", then "Target Keyword AND Peripheral Items" is added to the search query list (S506) before the list is outputted (S509). Otherwise, the search query list is simply outputted without any additions (S509) and the process terminated. If the browsing purpose were to be "web surfing", then the three keywords with the highest occurrence rate is extracted (S507). "(1 of above 3 keywords) AND Video" is then added to the search query list (S508) before it is outputted by the related information search query creation unit 22 (S509). The process is then terminated.

Although only the character strings are used for the search query in FIG. 15, it is also possible to combine the character strings with the search engine names. In this case, the search query could be created in such a way as to carry out the search on search engines focused on images or videos.

Figure 16:
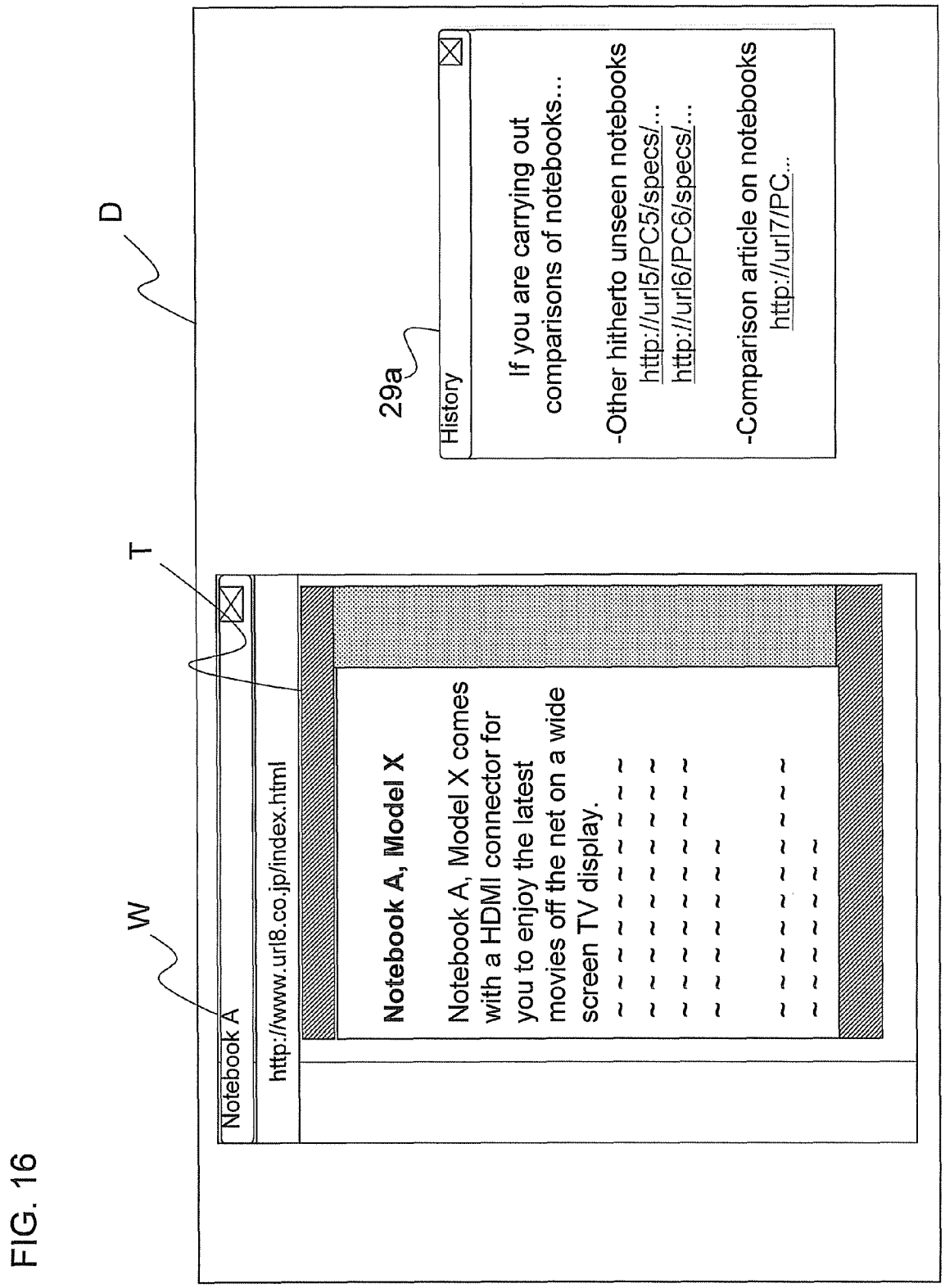
FIG. 16 is a diagram illustrating an example of the display of related information displayed by the related information display control unit 25.

Next, the related information displayed by the related information display control unit 25 by step S110 is explained in greater detail. FIG. 16 shows an example of the image shown on display 10 by related information display control unit 25. In this example, a related information display window 29a is initiated when a search is generated for related information. The links to related information is shown in this related information display window 29a. The user is able to access and view the related information or video clips by clicking on the links.

In order to provide more relevant to the user's needs and browsing purposes to allow for more effective browsing, the browsing purpose classification unit 18 attaches the related information categories to the classified browsing purposes and display them. By doing so, the user is able to get a rough idea of what is encompassed within the related information link that has been provided.

Figure 17:
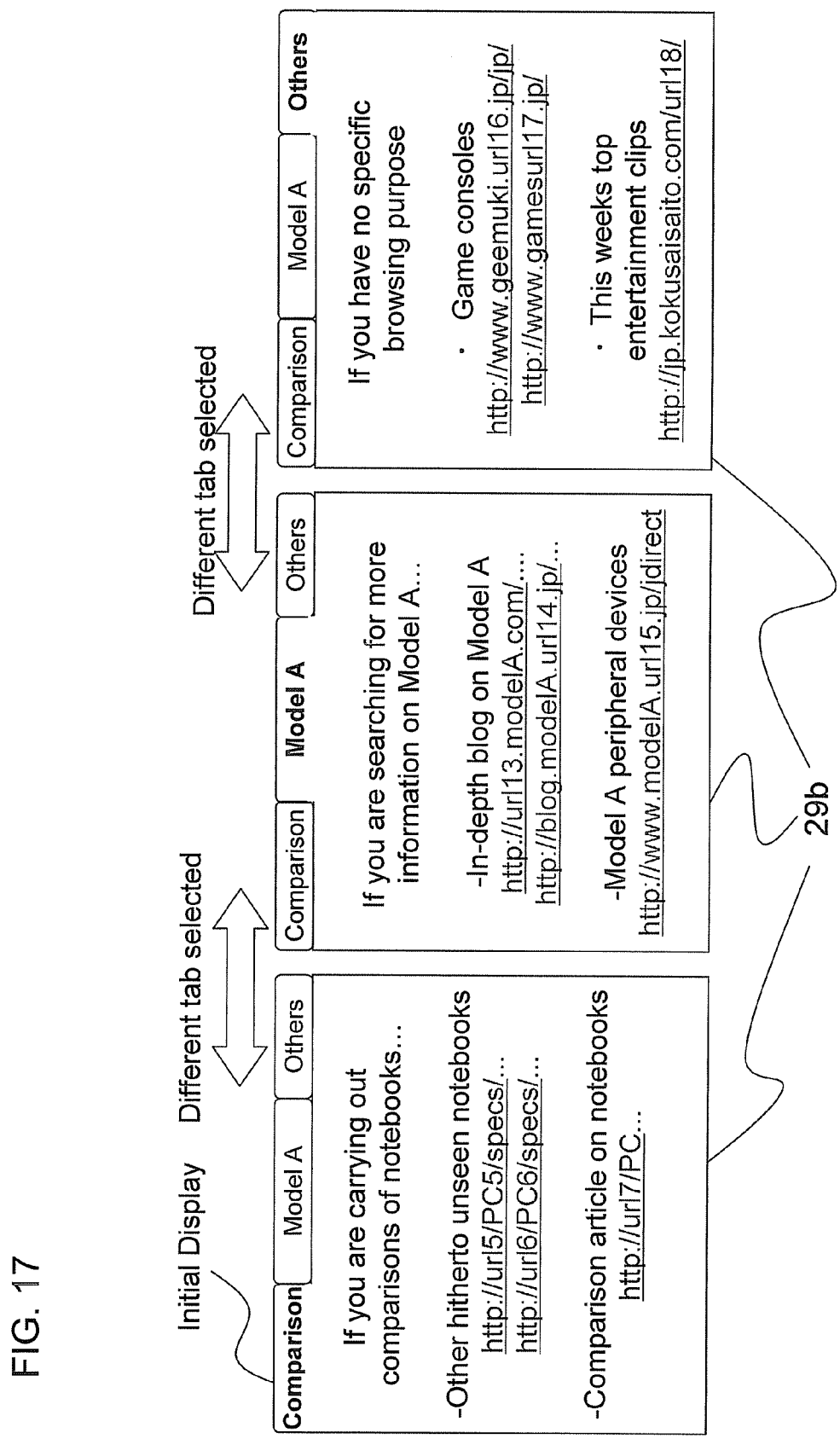
FIG. 17 is a diagram illustrating an example of the display of related information displayed by the related information display control unit 25.

FIG. 17 shows another example of the display method for the related information in which the related information is split up into various categories and shown in tabs as seen in related information window 25b. In this example, instead of just carrying out classification of browsing purposes, the browsing purposes are also evaluated and ranked in terms of relevance. For example, in terms of the webpage currently being viewed, the likeliest categories are "Comparison", "Model A" and "Others". The keywords and browsing purposes are then arranged accordingly. The related information search query creation unit 22 creates search queries based on these as seen in step S108 of FIG. 2. Related information matching the browsing purposes chosen is then obtained and displayed. This is done by the related information search unit 24, which also sends the search queries to an external search engine for the carrying out of the search as described in step S109. The results generated are then received.

As shown in step S110, the related information display control unit 25 receives the search results from related information search unit 24. The search results are displayed on display unit 10 after being associated to its corresponding browsing purpose. By manually manipulating the tabs, the user is able to choose the categories they would like to view. The order in which the categories are displayed is decided by browsing purpose classification unit 19.

Figure 18:
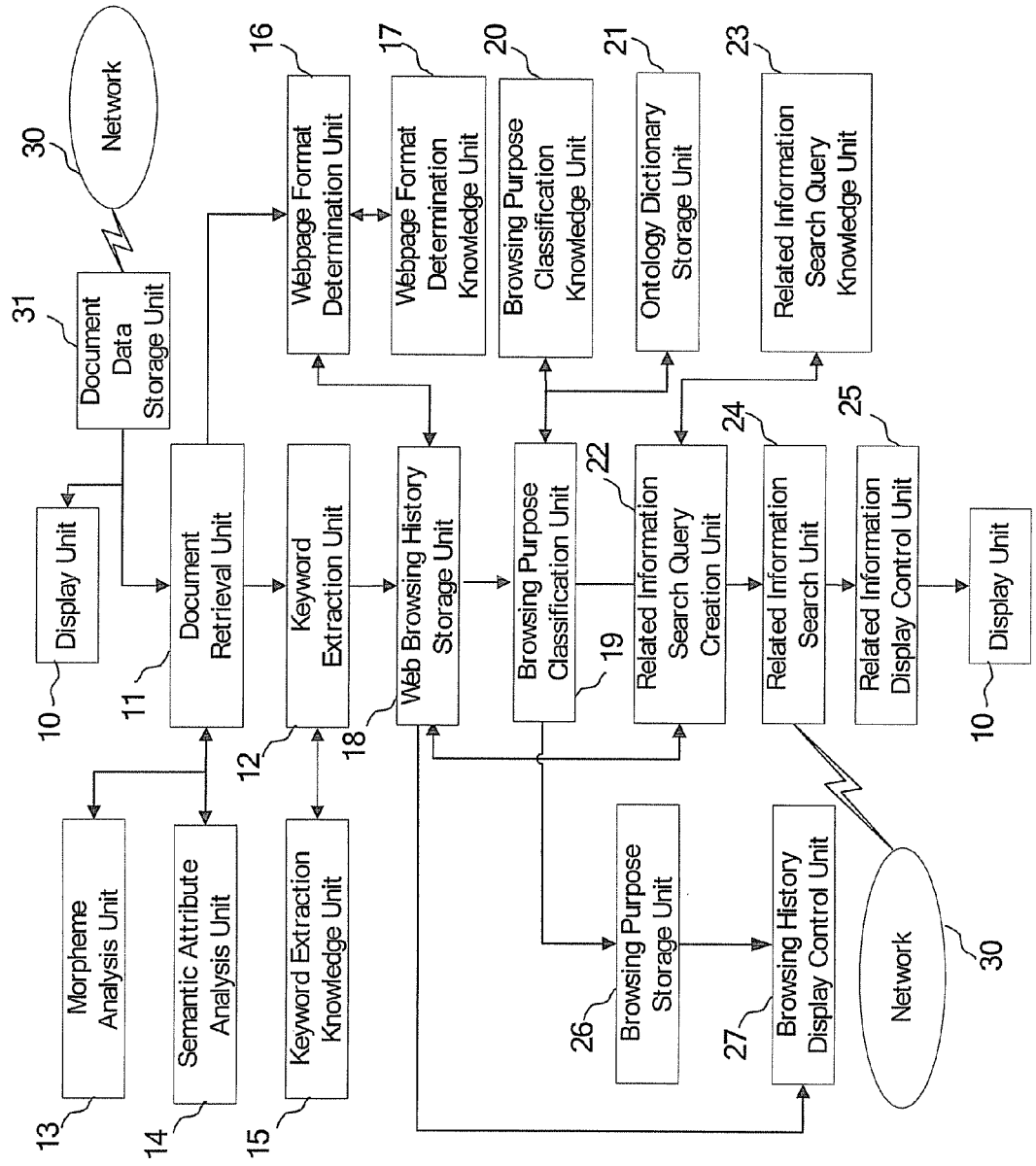
FIG. 18 is a functional block diagram illustrating a second embodiment of the web browsing purpose classification apparatus of the present invention.

FIG. 18 shows a functional block diagram of another embodiment of the present invention. The main components are essentially the same as that shown in FIG. 1. However, a browsing purpose storage unit 26 for the storage of browsing purpose history and a browsing history display control unit 27 for the display of the browsing history are added.

Figure 19:
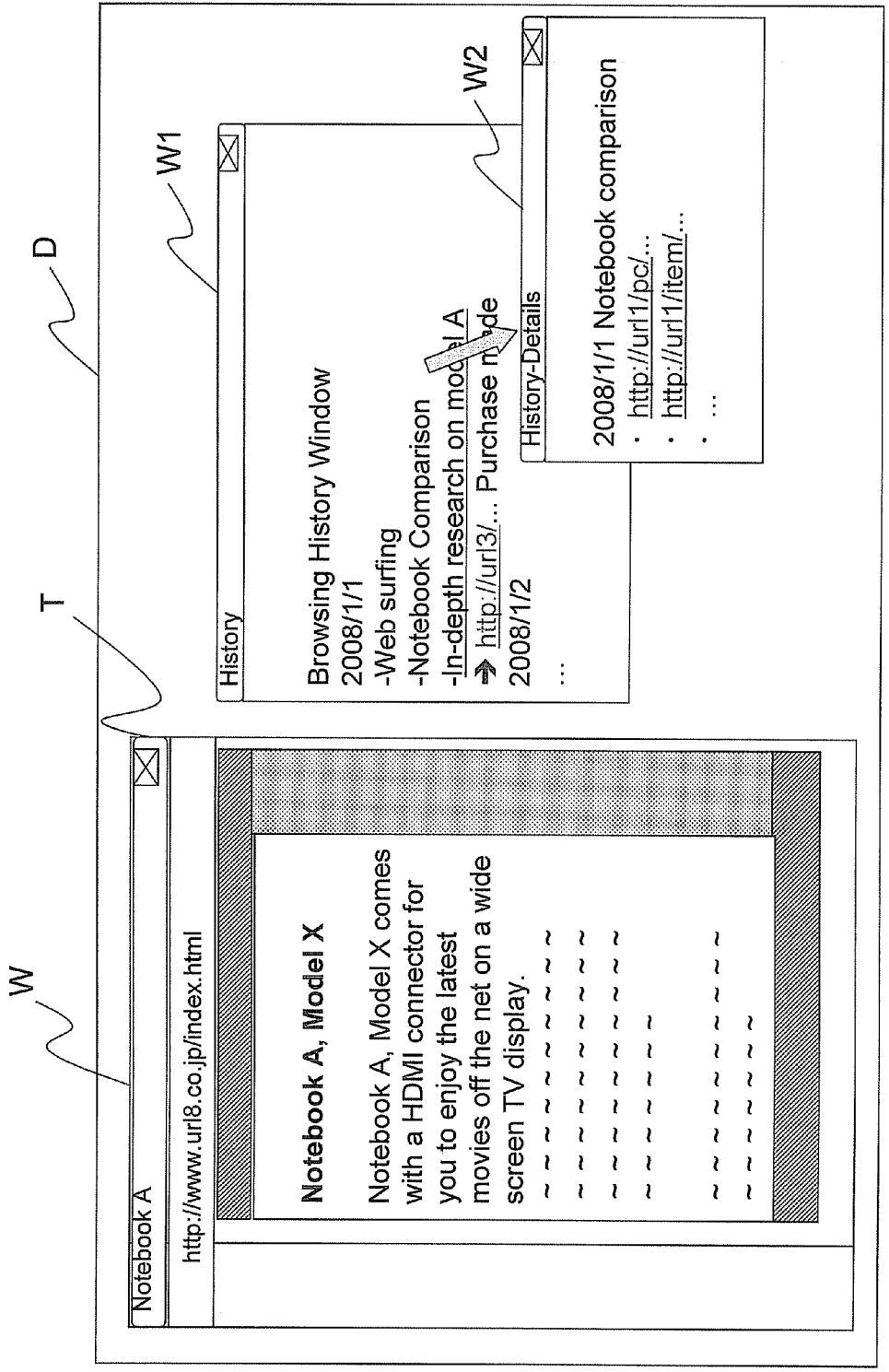
FIG. 19 is a diagram illustrating an example of the display method of the browsing history display control unit as shown in FIG. 16.

FIG. 19 shows an example of the browsing history being displayed by the browsing history display control unit 27. In this example, the browsing purposes are classified and split into categories. The categories are displayed in chronological order in a window W1. By clicking on the categories, the links contained within the categories are displayed in a separate window W2. It is also possible for this to be displayed in the event that the user is shopping on the web or checking his email.

Although the above embodiments show the processing as being carried out in web browsing purpose classification apparatus, it is also possible to have a PC and web browsing purpose classification apparatus as one combined apparatus. Web browsing purpose classification apparatus can also be a normal computer with components like a control device like CPUs, memory devices like ROMs and RAMs, external storage devices like HDDs, display devices and input devices like keyboards and mice.

It is also possible to realise the above invention using the standard hardware found in computers on the mass market today. The execution of the programs is carried out by the modules possessing the above listed capabilities. The program can either be in the form of installable files or executable files stored on computer-readable media like CD-ROMs, floppy disks, CD-Rs, DVDs, etc. It can also be preinstalled on memory modules like ROMs.

As used in this application, the terms "component", "unit" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems or units (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art recognize many modifications may be made to this configuration without departing from the scope or spirit of the claimed subject matter.

While the subject matter is described above in the general context of computer-executable instructions of a computer program that runs on a computer and/or computers, those skilled in the art recognize that the innovation also may be implemented in combination with other program modules. Generally, program modules include routines, programs, components, data structures, and the like, which perform particular tasks and/or implement particular abstract data types. Moreover, those skilled in the art appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

What is claimed is:

1. A web browsing purpose classification apparatus, comprising:
   a display unit which displays a webpage;
   a document retrieval unit which retrieves document data from the displayed webpage;
   a keyword extraction knowledge unit which stores knowledge necessary for keyword extraction;
   a keyword extraction unit which extracts keywords from the document data based on the knowledge stored in the keyword extraction knowledge unit;
   a webpage format determination knowledge unit which stores knowledge necessary for the determination of webpage formats;

a webpage format determination unit which determines webpage format based on the knowledge in the webpage format determination knowledge unit;

a web browsing history storage unit which stores the keywords, webpages and webpage formats as web browsing history;

a browsing purpose classification knowledge unit which stores browsing purposes classification knowledge including the keywords extracted from the document data and a browsing path pattern that is utilized to select one or more of the webpages associated with the web browsing history based on a comparison of a defined set of content-unrelated character strings to character strings included in web addresses associated with the webpages; and a browsing purpose classification unit which classifies, using at least one processor, browsing purposes based on the web browsing history and the browsing purposes classification knowledge including the browsing path pattern and the keywords stored in the browsing purpose classification knowledge unit, wherein the browsing purposes include an information collection mode for gathering of specific information and a web surfing mode which has no specific information gathering aim, wherein the information collection mode includes an in-depth research mode which gathers detailed information associated with a particular keyword among the keywords stored in the web browsing history and a comparison mode which gathers related information for comparison purposes, and wherein the browsing purposes are determined to be in the in-depth research mode, which gathers the detailed information associated with the particular keyword among the keywords stored in the web browsing history, when the browsing path pattern of the browsing purposes corresponds to the in-depth research mode and the particular keyword among the keywords stored in the web browsing history matches another keyword stored in the web browsing history.

2. The apparatus according to claim 1, further comprising:
an ontology dictionary which determines the meaning relationships for the keywords.

3. The apparatus according to claim 1, wherein the keyword extraction unit further comprises at least one of a morpheme analysis unit which carries out morpheme analysis of the document data or a semantic attribute analysis unit which carries out semantic attribute analysis on character strings of the document data.

4. The apparatus according to claim 1, wherein the browsing purpose classification unit extracts the keywords which are common to the documents of the web browsing history as target keywords.

5. The apparatus according to claim 1, wherein the browsing purposes are determined to be in the comparison mode, which gathers the related information for comparison purposes, when the browsing path pattern of the browsing purposes corresponds to the comparison mode and the particular keyword among the keywords stored in the web browsing history matches the other keyword stored in the web browsing history.

6. The apparatus according to claim 1, further comprising:
a browsing purpose storage unit which associates the target keywords and browsing purposes with the web browsing history; and
a browsing history display control unit which displays the web browsing history along with the associated target keywords and browsing purposes on the display unit.

7. The apparatus according to claim 1, further comprising:
a related information search query creation knowledge unit which stores knowledge necessary for the creation of related information search queries related to the individual browsing purposes;
a related information search query creation unit which creates the related information search queries;
a related information search unit which carries out the search for related information; and
a related information display control unit which displays the related information search results on the display unit.

8. A web browsing purpose classification method, comprising:
displaying a webpage;
retrieving document data from the displayed webpage;
extracting keywords from the document data based on knowledge stored in a keyword extraction knowledge storage unit;
determining webpage formats based on knowledge stored in a webpage format determination knowledge unit;
storing the keywords, webpages and webpage formats as web browsing history;
storing browsing purposes classification knowledge including the keywords extracted from the document data and a browsing path pattern that is utilized to select one or more of the webpages associated with the web browsing history based on structure of web addresses associated with the webpages; and
classifying, using at least one processor, browsing purposes based on the browsing purposes classification knowledge and webpage formats including the browsing path pattern and the keywords stored as web browsing history,
wherein the browsing purposes include an information collection mode for gathering of specific information and a web surfing mode which has no specific information gathering aim, wherein the information collection mode includes an in-depth research mode which gathers detailed information associated with a particular keyword among the keywords stored in the web browsing history and a comparison mode which gathers related information for comparison purposes, and
wherein the browsing purposes are determined to be in the in-depth research mode, which gathers the detailed information associated with the particular keyword among the keywords stored in the web browsing history, when the browsing path pattern of the browsing purposes corresponds to the in-depth research mode and the particular keyword among the keywords stored in the web browsing history matches another keyword stored in the web browsing history.

9. The method according to claim 8, further comprising:
generating search queries for information related to the browsing purposes.

10. The method according to claim 9, further comprising:
providing the search queries for an external search.

11. The method according to claim 10, further comprising:
receiving search results from the external search.

12. The method according to claim 11, further comprising:
displaying the search results from the external search.

13. The method according to claim 8, wherein extracting keywords comprises splitting up contents of an HTML document into separate character strings and filtering the character strings.

14. The method according to claim 8, wherein extracting keywords comprises performing a morpheme analysis.

15. The method according to claim 8, wherein extracting keywords comprises performing a semantic attribute analysis.

16. The method according to claim 8, wherein classifying browsing purposes uses common characteristics among keywords, special characteristics of the web browsing path, and ontology between keywords.

17. The apparatus according to claim 1, wherein a query is modified according to the determined browsing purposes.

18. The method according to claim 8, further comprising:
modifying a query according to the determined browsing purposes.

19. A web browsing purpose classification apparatus, comprising
- a display unit which displays a webpage;
- a document retrieval unit which retrieves document data from the displayed webpage;
- a keyword extraction knowledge unit which stores knowledge necessary for keyword extraction;
- a keyword extraction unit which extracts keywords from the document data based on the knowledge stored in the keyword extraction knowledge unit;
- a webpage format determination knowledge unit which stores knowledge necessary for the determination of webpage formats;
- a webpage format determination unit which determines webpage format based on the knowledge in the webpage format determination knowledge unit;
- a web browsing history storage unit which stores the keywords, webpages and webpage formats as web browsing history;
- a browsing purpose classification knowledge unit which stores browsing purposes classification knowledge including the keywords extracted from the document data and a browsing path pattern that is utilized to select one or more of the webpages associated with the web browsing history based on structure of web addresses associated with the webpages; and
- a browsing purpose classification unit which classifies, using at least one processor, browsing purposes based on the web browsing history and the browsing purposes classification knowledge including the browsing path pattern and the keywords stored in the browsing purpose classification knowledge unit, wherein the browsing purposes include an information collection mode for gathering of specific information and a web surfing mode which has no specific information gathering aim, wherein the information collection mode includes an in-depth research mode which gathers detailed information associated with a particular keyword among the keywords stored in the web browsing history and a comparison mode which gathers related information for comparison purposes, and wherein the browsing purposes are determined to be in the in-depth research mode, which gathers the detailed information associated with the particular keyword among the keywords stored in the web browsing history, when the browsing path pattern of the browsing purposes corresponds to the in-depth research mode and the particular keyword among the keywords stored in the web browsing history matches another keyword stored in the web browsing history.

* * * * *